United States Patent [19]

Eigenbrod

[11] Patent Number: 5,391,002
[45] Date of Patent: Feb. 21, 1995

[54] HYDROSTATIC RADIAL POCKET BEARING FOR A SERVO CYLINDER

[75] Inventor: Karl-Heinz Eigenbrod, Gemünden, Germany

[73] Assignee: Mannesmann Rexroth GmbH, Germany

[21] Appl. No.: 257,581

[22] Filed: Jun. 9, 1994

Related U.S. Application Data

[63] Continuation of Ser. No. 872,394, Apr. 23, 1992, abandoned.

[30] Foreign Application Priority Data

Apr. 25, 1991 [DE] Germany .................. 4113540
Apr. 15, 1992 [DE] Germany .................. 4212630

[51] Int. Cl.⁶ ........................................ F16C 32/06
[52] U.S. Cl. ........................... 384/12; 384/118; 384/119
[58] Field of Search ............. 384/115, 118, 12, 119, 384/111

[56] References Cited

U.S. PATENT DOCUMENTS

| | | |
|---|---|---|
| 2,054,055 | 9/1936 | Klahn . |
| 2,449,297 | 9/1948 | Hoffer . |
| 3,640,590 | 2/1972 | Beisemann . |
| 4,232,913 | 11/1980 | Nilsson . |
| 4,351,574 | 9/1982 | Furukawa et al. . |
| 4,685,813 | 8/1987 | Moog . |
| 4,710,035 | 12/1987 | Vaughn . |

FOREIGN PATENT DOCUMENTS

| | | |
|---|---|---|
| 0007409 | 2/1980 | European Pat. Off. . |
| 0041008 | 12/1981 | European Pat. Off. . |
| 0090281 | 10/1983 | European Pat. Off. . |
| 0105050 | 4/1984 | European Pat. Off. . |
| 2153989 | 6/1972 | Germany . |
| 2225360 | 12/1973 | Germany . |
| 2645050 | 4/1977 | Germany . |
| 0143297 | 8/1980 | Germany . |
| 3024150 | 9/1981 | Germany . |
| 0242456 | 1/1987 | Germany . |
| 0489723 | 6/1970 | Switzerland . |
| 1362976 | 12/1971 | United Kingdom . |
| 1426520 | 3/1976 | United Kingdom . |
| 1051339 | 10/1983 | U.S.S.R. . |

OTHER PUBLICATIONS

Carl Schenck AG, Hydropuls-Langszylinder PL, Hydropuls-Spezifikation 1 PL 8707 (English translation and statement of relevancy attached), (no date).

*Primary Examiner*—Lenard A. Footland
*Attorney, Agent, or Firm*—Cushman, Darby & Cushman

[57] ABSTRACT

A hydrostatic radial pocket bearing for a servo cylinder is described, particularly for a high performance testing cylinder, of the kind as used, for example, in test rig or simulation technology. The radial pocket bearing is suitable for the highly precise regulation of the piston and for receiving large transverse forces acting on the piston rod. An even number of bearing pockets is uniformly distributed over the bearing periphery and fed from a source of pressure fluid by way of associated preliminary throttles connected to pressure supply conduits and by way of an associated connecting conduit. The preliminary throttles are formed by the bearing gap between a supply orifice and at least one outlet groove in an opposite bearing pocket, the bearing pocket being in the form of a reentrant depression either in the fixed or in the moving bearing portion. To reduce loss energy caused by leakage and at the same time increase the force carrying capacity of the bearing, the pressure drop of the pressure fluid flow axially away from the bearing pocket is different on both sides.

44 Claims, 8 Drawing Sheets

HYDROSTATIC RADIAL POCKET BEARING FOR A SERVO CYLINDER

This is a continuation of application Ser. No. 07/872,394, filed on Apr. 23, 1992, which was abandoned upon the filing hereof.

The invention relates to a hydrostatic radial pocket bearing for a serve cylinder, particularly for a high performance testing cylinder.

Serve cylinders which are, for example, used in test rig and simulation technology are, inter alia, characterised in that, with the aid of very precise regulation, they are adapted to apply to a system forces in the region of a few N up to a few 10,000N with a high degree of accuracy as far as the size and the time of the force are concerned. It is particularly when used in simulation technology that the extended pistons are subjected to more or less large radial reaction forces and this justifies the use of hydrostatic bearings in the region of the piston rod.

A hydrostatic pocket bearing of the aforementioned kind is already known. In order to enable the gap control to be undertaken with sufficient precision, it is generally required to feed the bearing pockets with pressure fluid by way of a respective preliminary throttle in order thereby to achieve a reproducible relationship between the pocket pressure and the amount of pressure medium flow. In the known case, the preliminary throttle is formed by a capillary throttle in the form of a helical tube having a length of for example about 0.4 m and an internal diameter of about 0.6 mm. This, however, involves a comparatively high technical production cost which it was possible to reduce during subsequent development by replacing the capillary tube with a screwthreaded spindle radially inserted in the bearing bush. This solution enabled the production costs to be reduced but did not eliminate the problems encountered during adjustment.

In the case of hydrostatic bearings for servo cylinders of the aforementioned kind, another difficulty is that the loading range of the piston or piston rod is very large and one must therefore ensure that the leakage loss can be limited independently of the pressures that occur.

The invention is therefore based on the problem of providing a hydrostatic pocket bearing for servo cylinders to permit a high loading and a good ability to control the bearing gap and at the same time present a low loss caused by leakage.

According to the invention, a preliminary throttle is used which works on the principle of a so-called diaphragm throttle. The annular throttling surface of the diaphragm throttle is in this case formed by the opposed bearing gap between the piston rod or piston and the piston guide or piston rod guide. During throughflow of this throttle gap on the side of the piston or piston rod opposite to the associated bearing pocket, the fluid pressure supplied by way of the pressure supply conduit, i.e. the pump pressure, drops to the pocket pressure and is led into the bearing pocket by way of the associated connecting conduit which is at the intermediate pressure. Accordingly, when the loading on the side of one bearing pocket increases, the piston or piston rod wanders away from the guide bore to the opposite side whilst increasing the width of the throttle gap. In this way, a larger amount of hydraulic fluid flows through the preliminary throttle to the bearing which is subjected to the higher load, so that deflection of the piston is opposed.

This principle of controlling the bearing gap has become known through a hydrostatic bearing according to EP 0,105,050 B1. In view of the fact that this arrangement and construction of the preliminary throttle leads to a very sensitive regulating system because it reacts dynamically, the throttling characteristic already departing from the desired position as the part that is to be supported by the bearing is displaced, one has hitherto assume that, to secure the control function of the bearing, one has to ensure that the same pressure drop is available at the free edges of the bearing pockets. In contrast, the invention is based on the surprising discovery that the regulating function of the preliminary throttle can be maintained whilst retaining the high dynamics even if the pressure drop of the pressure fluid flow axially away from the bearing pocket is different on both sides. In this way, the edge of the bearing pocket facing the cylinder chamber can be in limited controlled fluid flow communication with the cylinder chamber under pressure directly by way of the bearing gap, i.e. without iterposing a discharge groove. This gives the additional advantage that the loadability of the bearing can be considerably increased and leakage losses minimised.

The document SU 616,455 A already discloses a hydrostatic pocket bearing for an axially moved guide, in which the preliminary throttles for the bearing pockets are likewise formed by the bearing gap within the depressions forming the opposite bearing pocket, the parts of the bearing gap forming the preliminary throttles in each case being bounded in the direction of flow by inlet grooves and outlet grooves communicating with a source of pressure fluid by way of outlet conduits and with the opposite bearing pocket by way of discharge conduits, respectively. In this case, symmetrical discharge conditions likewise obtain on both sides in the region of the bearing pocket insofar that the hydraulic medium flowing out of the bearing pocket is received by a circular discharge groove surrounding the pocket. Since the supply orifice is disposed between the discharge groove and the outlet orifice at the centre of the bearing pocket, considerable leakage losses do, however, occur and these discourage the use of such a bearing for a servo cylinder with a quality of the aforementioned kind.

In contrast, the construction of the hydrostatic pocket bearing in accordance with the invention permits the supply pressure and thus also the operating pressure of the servo cylinder to be elevated to pressure ranges up to about 280 bar without thereby incurring the danger of increasing the leakage energy excessively.

By means of the features according to the invention, the pocket bearing may be provided in the region of the guide for the piston rod as well as in the region of the piston itself. In the embodiment of the invention as a pocket bearing for the piston rod of the servo cylinder, it is formed in the region of at least one piston rod guide (16) of the servo cylinder (4) and a discharge conduit (5) is provided at an axial spacing (A) from the bearing pocket boundary (40) on the side remote from the cylinder chamber (8). This embodiment is of particular advantage, especially with regard to the loading capacity and the reduction of the leakage losses.

If the axial spacing between the boundary of the bearing pocket on the side remote from the cylinder chamber and a discharge groove is smaller than the axial width of the bearing gap adjoining the cylinder chamber, the pressure acting in the cylinder chamber can be raised still further without detrimentally influencing the regulating function of the diaphragm throttle.

It has been found that the highest loading values are achievable if the geometry is selected such that the axial width BA is about 2 to 3 axial spacing A.

Providing a bearing bush (30; 130; 330) which is a friction fit in a rigid sleeve (62; 362) of the piston rod guide (16) brings about a simplified construction of the hydrostatic pocket bearing, it being of additional advantage that the outer surface of the bearing bush presents comparatively large free space for forming the required connecting and/or pressure supply conduits.

In accordance with the invention, the hydrostatic pocket bearings are configured to supply the hydraulic flow medium so that any leakage that might occur out of the grooves or groove sections that are under pressure will not act disadvantageously on the functional reliability of the bearing.

By providing a structure wherein at least one branch passage (372) from a groove section (368) to the bearing zone has a section which is substantially tangential to the bearing diameter (DL), one can ensure by the simplest means that the intermediate pressures will not become negatively superimposed. The tangential guiding and arrangement of the section of the branch passage permits the central angle over which the passage section which is at intermediate pressure and connects the diametrally opposed bearing zones extends to be reduced to nearly 90°, so that the groove sections substantially disposed in a common radial plane can likewise be spaced circumferentially by nearly 90°.

The branch passages are preferably disposed in radial planes. In this case, it is advantageous to arrange the grooves such that the groove (366) at pump pressure is disposed laterally at an axial spacing adjacent to the axially adjacent grooves (368) which are at the intermediate pressure; in that the groove (366) at pump pressure is disposed radially outwardly of the bearing pocket (334).

At least between the groove which is at pump pressure and the axially adjacent intermediate pressure groove, there is preferably a circumferential or annular seal in order to preclude influencing of the intermediate pressure by leakage oil. This can be precluded still more effectively even for the highest pump pressures if on the side of the groove (366) at pump pressure that is remote from the groove (368) at intermediate pressure, a preferably circumferential leakage outlet groove (395) is provided at an axial spacing.

In the construction of the pocket bearing in the region of the piston itself, the different outflow conditions at both sides of the bearing pockets are produced by the pressure difference at both sides of the piston. In this construction, a discharge groove is dispensed with altogether. Leakage losses are insignificant in this embodiment. The pressure in the two cylinder chambers can in this construction be utilised at both sides of the bearing pockets for the purpose of additional stabilisation, i.e. to increase the radial loadability of the bearing.

By providing pressure supply conduits (2827, 284, 222) of the bearing pockets (234) that extend through a change-over valve (286) which is connected to the two cylinder pressure chamber (8,10) a very simple pressure fluid supply system for the hydrostatic bearing.

BRIEF DESCRIPTION OF THE DRAWINGS

Several examples of the invention will be described in more detail with reference to diagrammatic drawings, in which.

DETAILED DESCRIPTION OF THE PRESENTLY PREFERRED EXEMPLARY EMBODIMENTS

Figure 1:
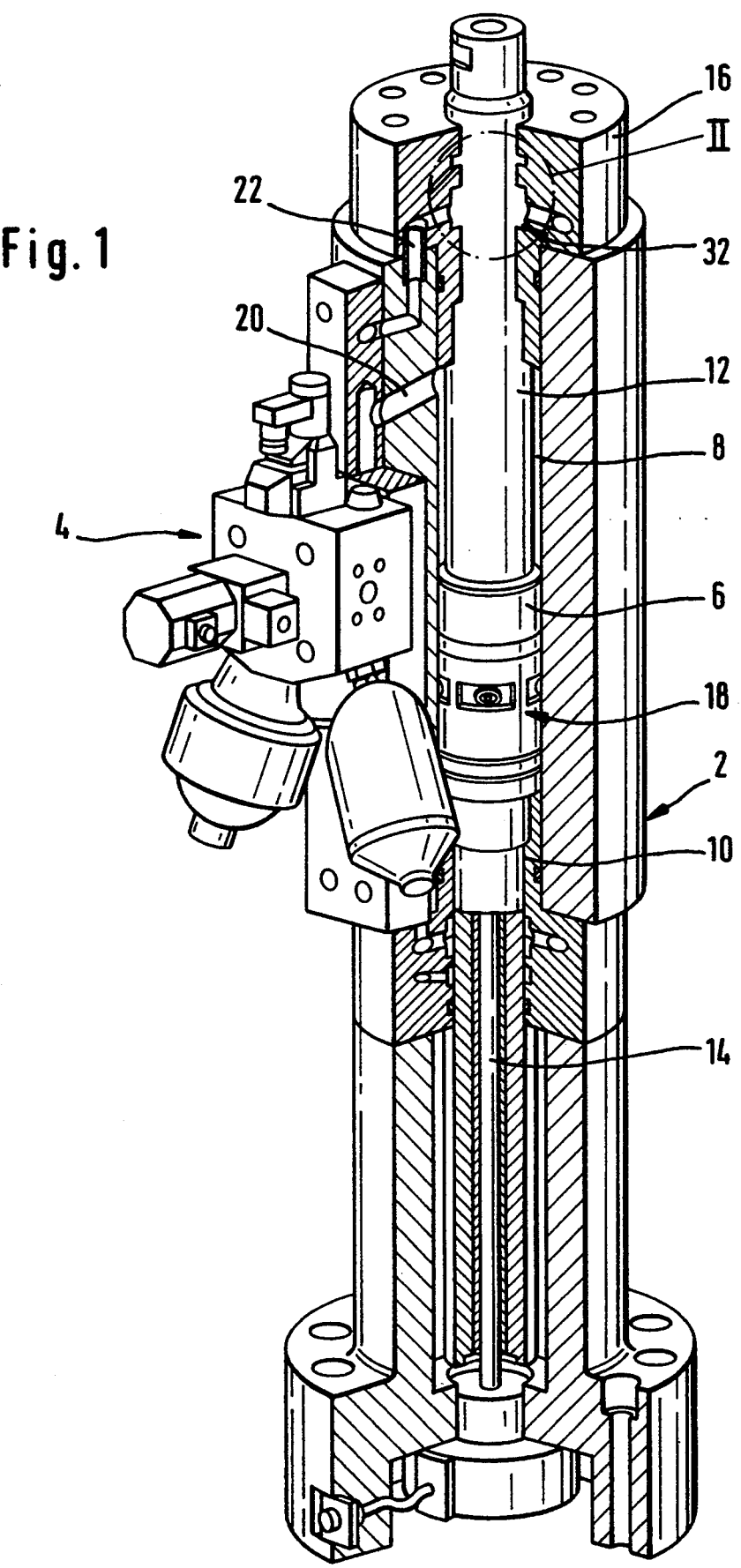
FIG. 1 is a perspective part-sectional view of a servo cylinder of which the piston is provided with a hydrostatic bearing.

The reference numeral 2 in FIG. 1 indicates a servo cylinder such as used, for example, in test rig or simulation technology. The servo cylinder is a double acting cylinder in the form of a uni-directional cylinder. The invention is, however, not restricted to such cylinders and can be analogously applied to differential cylinders. The two cylinder pressure chambers are designated 8 and 10, respectively, and the piston rod sections at both sides of the piston portion 6 are designated 12 and 14.

Depending on the field of application of the servo piston, a predetermined exactly regulated force is applied by way of the outwardly projecting piston rod section 12 onto a system such as a movement simulating system as is conventional in so-called simulation technology. Such servo cylinders not only demand a very accurate movement with respect to time but, in addition, the forces applied by such pistons must be accurately regulated over a very wide range. Since these forces not only act in the axial direction, it is necessary to support the piston rod and/or the piston in the radial direction, i.e. to provide extremely precise bearings to keep the friction losses as low as possible even with comparatively high radial forces acting on the outwardly projecting piston rod. For this purpose, a hydrostatic bearing is provided at least in the region of a guide section 16 of the servo cylinder 2. The hydrostatic bearing in accordance with the detail "II" will be described with reference to FIGS. 2 and 3. The embodiment illustrated in FIG. 1 also has such a hydrostatic bearing 18 in the vicinity of the actual piston 6 and the details of that bearing will be described hereinafter with reference to FIGS. 7 and 8.

Control of the cylinder pressure chambers takes place by way of a hydraulic control member 4, the construction of which does not require a more detailed explanation. The control member on the one hand serves to make available the hydraulic pressure fluid for feeding into the cylinder pressure chamber 8 or 10. A corresponding pressure fluid conduit is designated 20 in FIG. 1. On the other hand, the control member 4 makes available the hydraulic pressure fluid for the hydrostatic bearings that are still to be described. A corresponding pressure supply conduit is designated 22.

Figure 2:
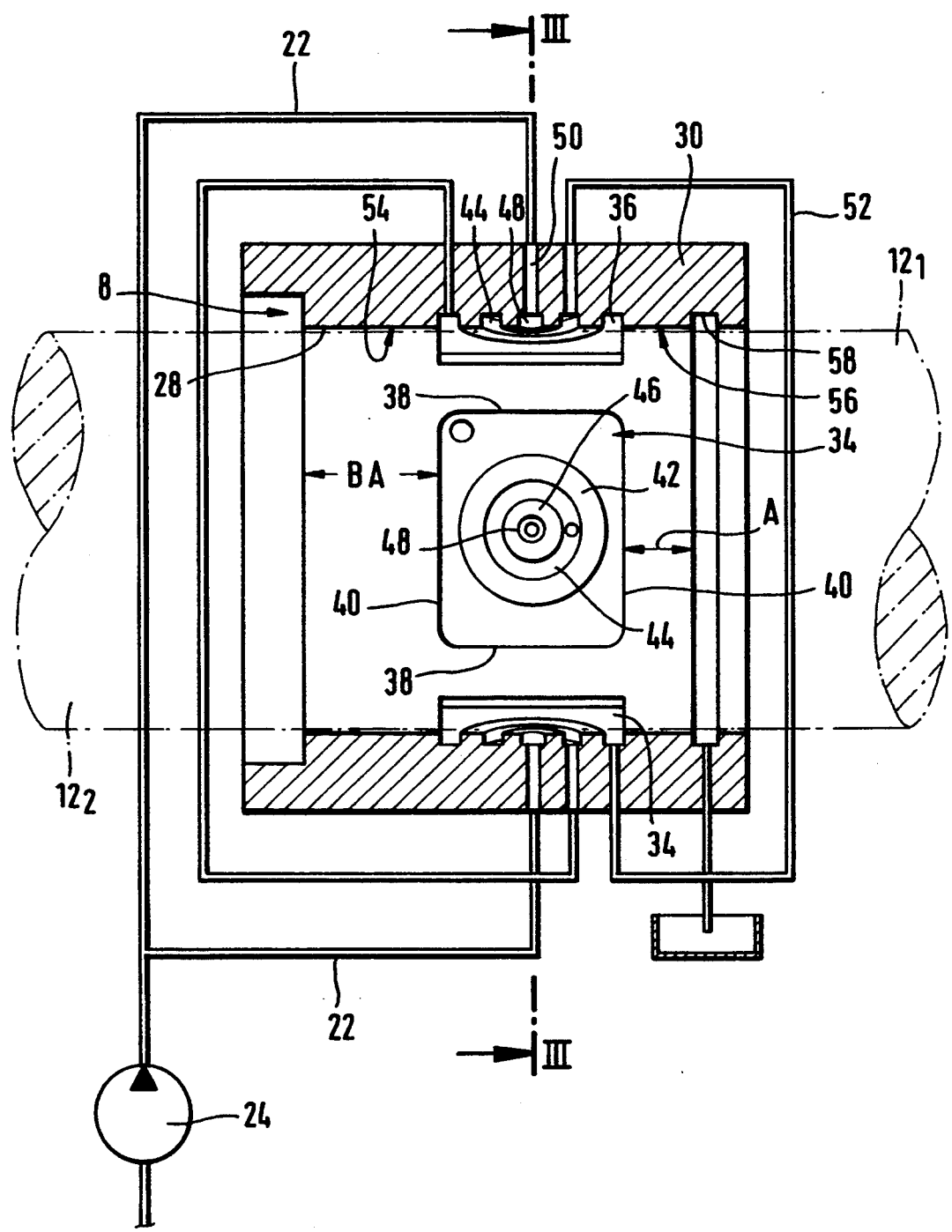
FIG. 2 is a diagrammatic elevation of detail II in FIG. 1, i.e. of a first embodiment of the hydrostatic bearing in the region of the piston rod guide.
Figure 3:
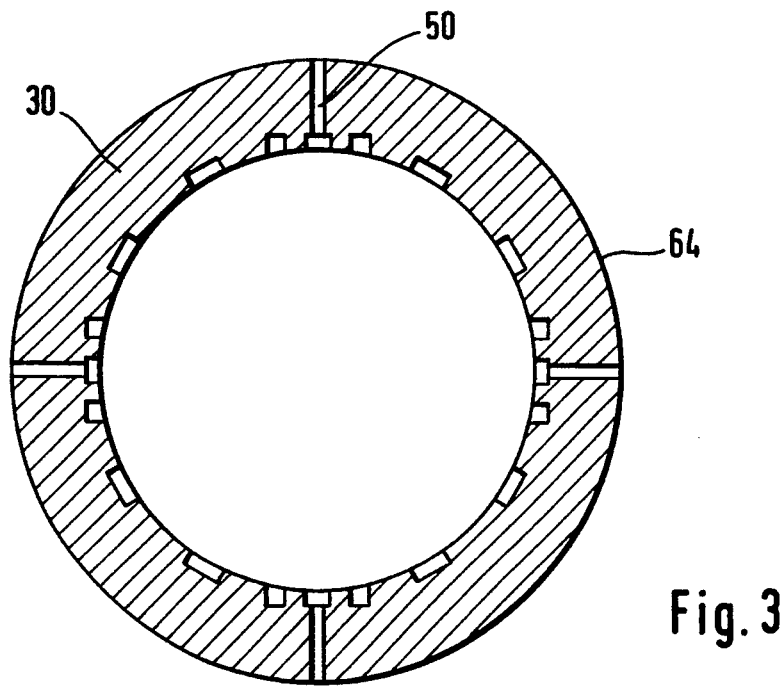
FIG. 3 is a section on line III—III in FIG. 2.

FIGS. 2 and 3 illustrate a first embodiment of the hydrostatic bearing in the region of the guide section 16 for the piston rod section 12. The piston rod section 12 is received in a guide bore 28 of a bearing bush 30 which, as will hereinafter to described, is preferably fitted with a shrinkage fit in a bushing in the region of the cylinder section 16. $12_1$ indicates the part of the piston rod section 12 that is remote from the cylinder pressure chamber 8 and $12_2$ designates the part facing the cylinder pressure chamber 8. In order to form a hydrostatic radial pocket bearing 32, an even number of circumferentially uniformally spaced bearing pockets 34 is recessed in the inner surface of the guide bore 28 of the bearing bush 30. The bearing pockets are preferably formed by re-entrant depressions 36, the cross-section of which is evident from the top and bottom of the representation in FIG. 2. We are here concerned with grooves which are, for example, rectangular, the bearing pocket 34 having an overall substantially rectangular outer contour. The bounding lines in the circumferential and axial direction are designated 38 and 40, respectively. Each bearing pocket 34 surrounds an annular outlet groove 44, an annular web 42 being interposed. The outlet groove 44 is, in turn, screened from a pressure medium supply orifice 48 by a likewise annular web 46. The orifice 48 is in each case supplied with high pressure hydraulic fluid with the aid of a radial bore 50, in each case by way of a pressure supply conduit 22 which is at pump pressure. A pump 24 serves as the energy source.

The FIG. 2 illustration also shows that the annular outlet groove 44 at each bearing position is in flow medium communication with the bearing pocket 34 of the diametrally opposite bearing position by way of a connecting conduit 52 which is at a pressure hereinafter referred to as the intermediate pressure. In this way, the annular web 46 forms an upstream gap throttle for the diametrally opposite bearing pocket between the supply orifice 48 and the outlet groove 44. With such a construction for the gap throttle, the flow conditions in the preliminary throttle can be so controlled that a substantially linear relationship is maintained between the pressure in the bearing pocket 34 and the amount of flow of the hydraulic flow medium. By means of the interconnection of the bearing pockets as previously described, one obtains a highly dynamic, that is to say rapidly responsive, regulating circuit for the relative positions of the piston rod 12 and bearing bush 30.

This is because if, for example, there should be a displacement of the piston rod 12 of FIG. 2 in a downwards direction relatively to the guide bore 28, then the pressure drop in the upper throttle gap of FIG. 2, i.e. in the flow path of the hydraulic pressure medium, will be reduced from the pressure medium supply groove 48 by way of the throttle web 46 to the outlet groove 44, whereby an increased resetting force is produced in the zone of the opposite bearing pocket and this resetting force will be built up all the more rapidly as the discharge gap is reduced on the part of the bearing pocket that is now being supplied with an increased pressure medium flow. Conversely, if the piston rod is displaced away from the bearing pocket, the pressure drop in the associated diametrally opposite throttle gap will increase, whereby the pressure in the bearing pocket becomes smaller and the piston rod will again be deflected towards the bearing pocket.

As already indicated, the discharge conditions out of the bearing pockets 34, especially in the axial direction, determine the regulating characteristic of the hydrostatic bearing. The peculiarity of the hereinbefore described hydrostatic bearing is regarded to be that these discharge conditions of the hydraulic pressure fluid are asymmetric out of the bearing pocket. This takes advantage of the surprising discovery that, despite this asymmetry of the discharge conditions, stable regulation of the bearing gap can be ensured. At the same time, this step leads to the fact that it is no longer necessary to arrange the bearing pockets so that the same distances have to be bridged with the same pressure drops for the laterally discharged hydraulic pressure fluid. The bearing gaps 54 and 56 at both sides of the bearing pocket 34 can therefore be traversed differently and even in different directions, which permits the inventive step of allowing the bearing gap 54 facing the cylinder pressure chamber to open directly into the cylinder pressure chamber 8. On the other hand, in the region of the bearing gap 56 on the side of the bearing pocket 34 remote from the cylinder pressure chamber 8, the bearing bush 30 contains a discharge groove 58 which discharges into the tank. By reason of this single discharge groove remote from the cylinder pressure chamber 8, a very low leakage loss energy for the bearing can be ensured even at high system pressures of about 280 bar and correspondingly high pressures in the bearing pocket of about 140 bar. At the same time, the connection of the bearing gap 54 to the cylinder pressure chamber 8 leads to additional stabilisation of the displaced piston rod 12 in the bearing bush 30, whereby the radial force-carrying capacity of the bearing could be increased by over 20% compared with a conventional hydrostatic bearing in accordance with EP 0,105,050 B1. At the same time, it was possible to reduce the loss energy of the bearing by about 50% so that the hydrostatic bearing as described above is suitable for use even at the highest system pressures. By suitably tuning the axial lengths of the bearing gaps 54 and 56 to each other, i.e. by adapting the axial spacing A of the bearing pocket edge 40 from the discharge groove 58 to the axial width BA of the bearing gap 54, one can find an optimum value with regard to leakage and supporting force. Preferably, the ratio of BA to A is in the region of about 3:1. By means of the discharge flow in the bearing gap 56 that is directed axially outwardly, one simultaneously obtains effective protection of the bearing from the penetration of dirt, which is of benefit to the life of the bearing.

To simplify the production of the hydrostatic radial pocket bearing, it is preferred to form the bearing pockets, the inlet orifices, the outlet grooves and the discharge groove in a special bearing bush 30 of steel or a corresponding bearing bronze or the like. The inner running surface can be provided with a special bearing layer such as a white metal bearing layer to improve the emergency running properties of the bearing. This bearing bush is preferably fitted into a thicker, i.e. rigid, sleeve 62, preferably shrunk in, and the sleeve is in turn fixed in the end section of the cylinder. This construction permits the various connections to the supply conduits 22 as well as the connecting conduits 52 to be formed as simple depressions in the outer cylinder surface 64 between the outlet grooves and the respective opposite bearing pockets. This will now be described in more detail with reference to FIG. 4.

A first circular groove 66 machined into the outer surface 64 serves as a pressure medium conduit to supply the individual radial bores 50 which open into the supply orifices 48. By way of a supply bore which is not shown in detail, the circular groove 66 is connected to the pressure supply conduit 22. Helically extending connecting grooves to form the previously described connecting conduits 52 are designated $68_1$ to $68_4$, each of these connecting grooves extending over an angle sector of 180° and terminating at a radial bore 70 or 72 by way of which a connection can be established between the respective outlet grooves and the associated bearing pockets on the opposite side. The passages of substantially rectangular cross-section formed in this manner are hermetically closed by the inner surface 74 of the sleeve 62 surrounding the bearing bush 30, so that additional sealing means are not required. This principle of forming the passages can, of course, also be used if, in departure from the illustrated embodiment having four circumferentially evenly distributed bearing pockets, a larger even number of bearing pockets is provided.

Figure 5:
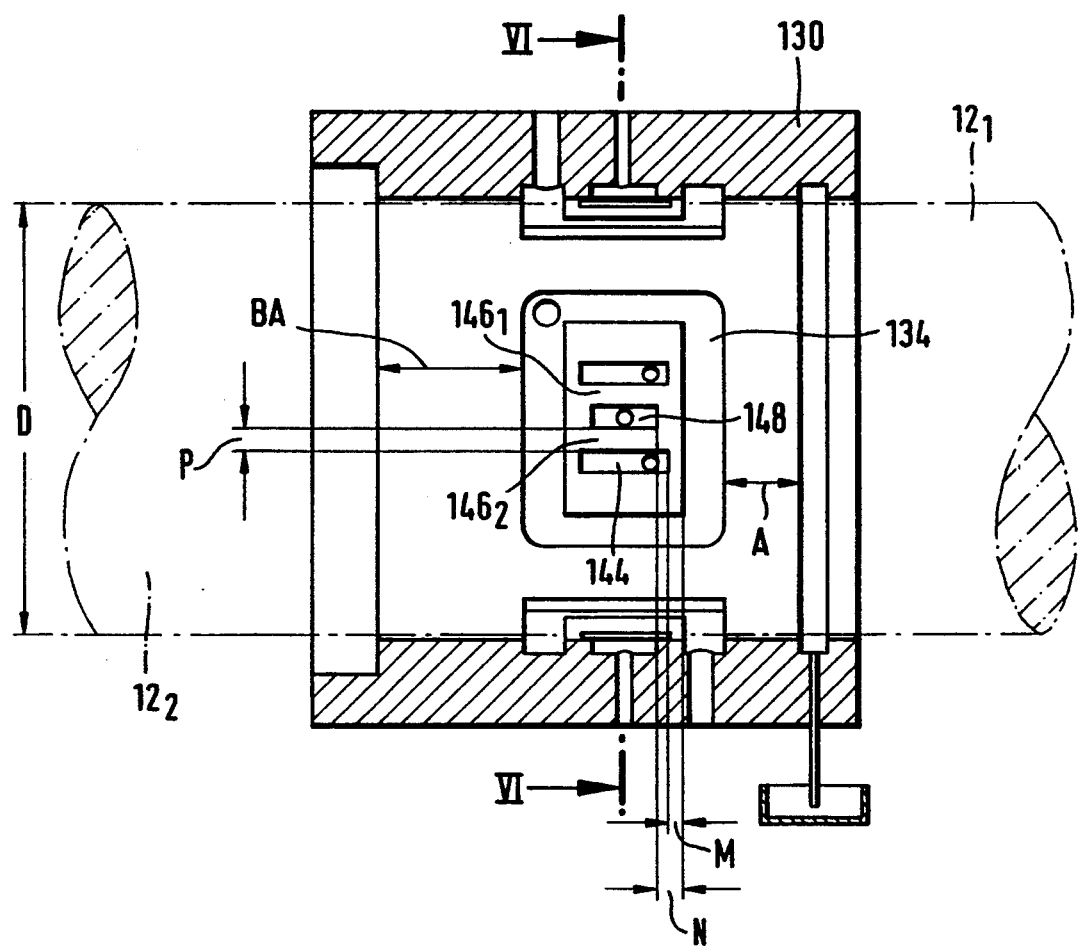
FIG. 5 is a view similar to FIG. 2 of a third embodiment of the hydrostatic bearing.
Figure 6:
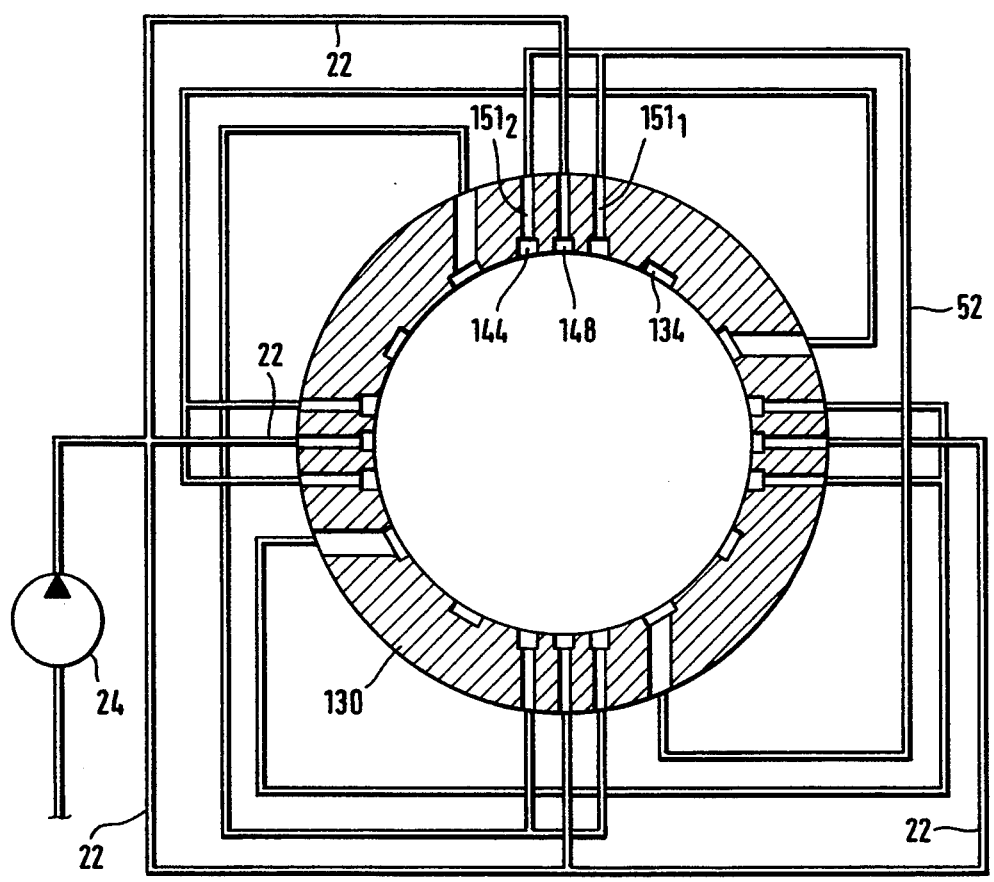
FIG. 6 is a section on the line VI—VI in FIG. 5.

FIGS. 5 and 6 illustrate a further embodiment of the hydrostatic radial pocket bearing for a servo hydraulically controlled high performance testing cylinder. To simplify the description, those components corresponding to the elements of the previously described embodiments are provided with identical reference numerals. Departures from the previously described embodiment reside merely in the construction of the bearing pockets and the gap throttles. Thus, the bearing pocket designated 134 is formed by a substantially rectangular groove and, in conformity with the previous embodiment, extends mainly circumferentially. The dimensions and positions of the bearing gaps 54 and 56 are likewise such the same, the bearing gap again being a few thousandths of the piston rod diameter D. Instead of the previously described circular pressure medium supply groove, the FIGS. 5 and 6 embodiment is provided with an axially extending depression 148 disposed centrally between two laterally extending outlet depressions 144 parallel thereto. The gap throttle required for regulating the bearing gap is thus formed by the surface zones $146_1$ and $146_2$ to both sides of the depression 148. The regulating characteristic of the hydrostatic bearing can be controlled by suitably tuning the parameters M, N and P to each other.

The two outlet depressions are connected to a common connecting conduit 52 by way of corresponding radial bores $151_1$ and $151_2$ and corresponding conduit sections, to produce a flow medium connection to the diametrally opposed bearing pocket 134. The connecting conduits 52 as well as the associated intermediate conduit sections can again be machined into the outer surface of a bearing bush 130 in the manner previously described. The supply of pressure medium for the depressions 148 is by way of pressure supply conduits 22 which are fed by a pump 24.

Figure 7:
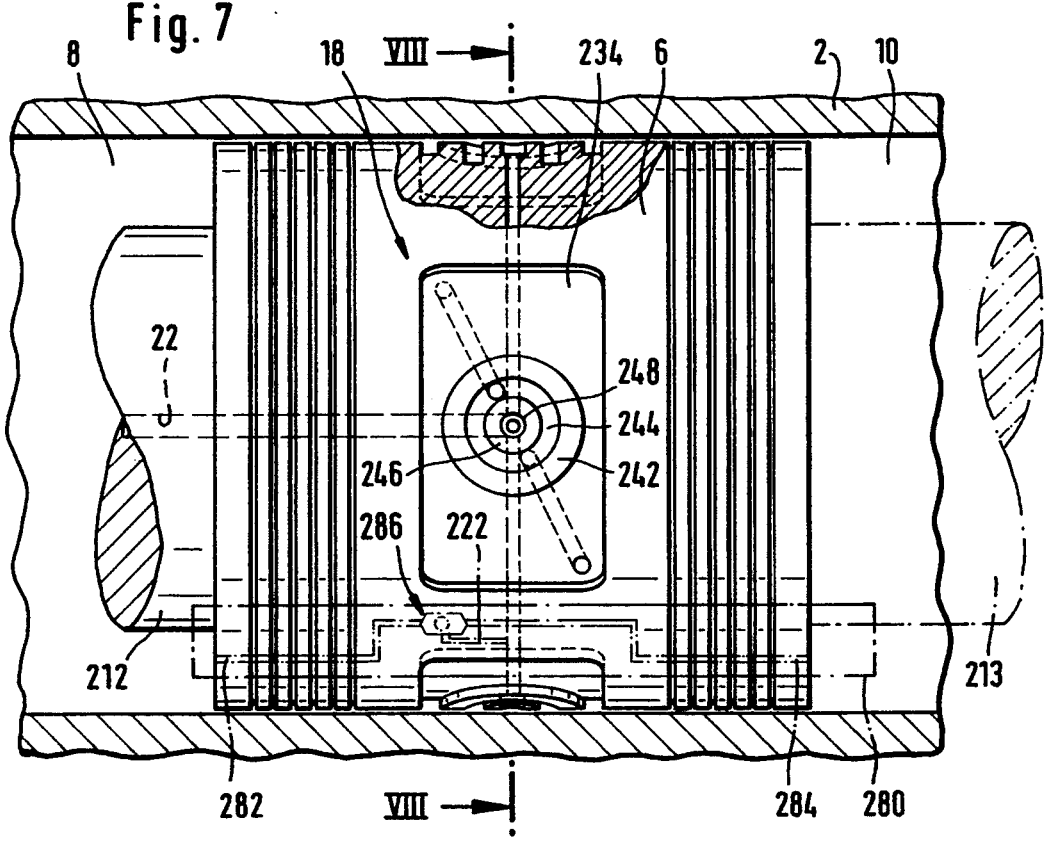
FIG. 7 is an elevation of a fourth embodiment of the hydrostatic bearing, wherein the bearing pockets are provided in the region of the piston.
Figure 8:
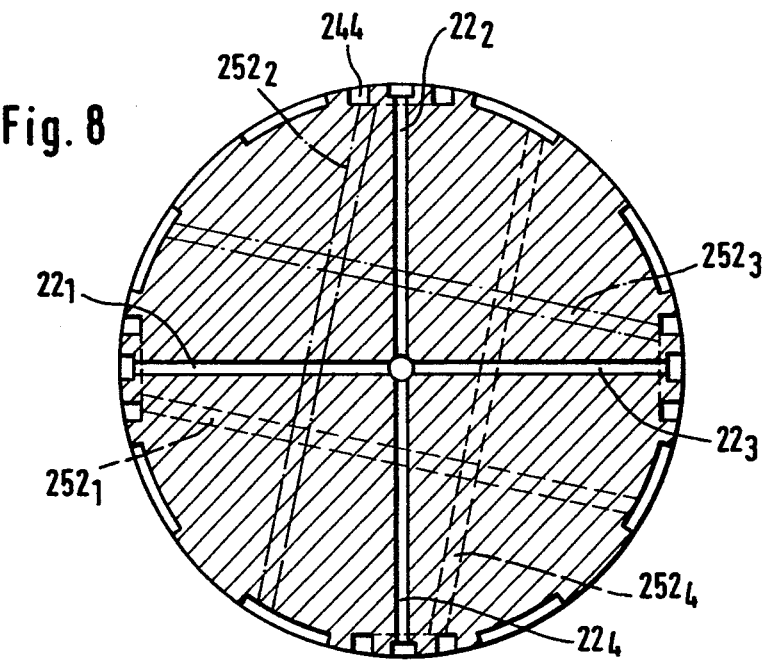
FIG. 8 is a section on the line VIII—VIII in FIG. 7.

FIGS. 7 and 8 illustrate a further embodiment of the hydrostatic pocket bearing that is designated 18 in FIG. 1. Departing from the previously described examples, this radial pocket bearing is provided in the region of the piston 6. Reference 212 designates a piston rod extending from the piston. A further piston rod 213 is indicated in chain dotted lines to show that the hydrostatic radial pocket bearing to be described in more detail hereinafter is equally suitable for use with differential cylinders or uni-directional cylinders. The cylinder pressure chambers at both sides of the piston 6 are indicated at 8 and 10.

FIG. 7 shows that the geometry of the bearing pockets 234 is substantially unchanged from the embodiment of FIGS. 1 to 4. The same applies to the arrangement and construction of the gap throttles, i.e. the webs 242, the annular outlet groove 244, the webs 246 and the central pressure medium inlet orifice 248. The depressions 234, 244 and 248 necessary for forming the previously mentioned components are not in the fixed bearing portion but they are formed or recessed in the movable bearing portion, i.e. in the piston 6. Accordingly, the supply of the hydrostatic radial pocket bearing is through the interior of the piston. The pressure supply conduit 22 coming from the pump (not shown) is a central bore through the piston rod 212.

Radially within the bearing, the pressure supply conduit 22 is divided into a number of radial branch conduits $22_1$ to $22_4$ depending on the number of bearing pockets 234, the branch conduits lead to the pressure medium inlet orifices 248. The circular web 246 produces throttling of the supply pressure to the actual pocket pressure, the throttle pressure fluid being led out of the outlet groove 244 into the bearing pocket 234 of the diametrally opposed bearing zone. The associated connecting conduits are designated $252_1$ to $252_4$.

The function of the hydrostatic radial pocket bearing 18 modified in this manner substantially corresponds to that of the previously described examples. However, the peculiarity of this bearing resides in the fact that a special discharge groove can be dispensed with insofar that the pressure level in the two cylinder pressure chambers 8, 10 is utilised. The asymmetric discharge conditions in the axial direction out of the bearing pocket 234 are produced in that, upon actuation of the servo hydraulically controlled high performance testing cylinder, a pressure drop exists between the pressure chambers 8 and 10 but this does not influence the regulating function of the pocket bearing. In this embodiment, the pressure in the pressure cylinder chambers 8 and 10 can again be utilised for additional stabilisation of the bearing, thereby also increasing the carrying force of the bearing in the region of the piston.

At the bottom of FIG. 7, the chain dotted lines illustrate a variation of the bearing according to which supply of the bearing pockets with pressure fluid can be considerably simplified. These pressure fluid supply means which, incidentally, can also be applied to the previously described embodiments, are designated 280. Instead of the central pressure supply conduit 22, there is a first pressure medium conduit 282 in flow communication with the cylinder pressure chamber 8 and a second pressure medium conduit 284 which is connected to the cylinder pressure chamber 10. These two pressure medium conduits are led to a change-over valve 286 from which a supply conduit 222 leads to the individual branch conduits $22_1$ to $22_4$. The change-over valve applies to the bearing positions the higher of the pressures subsisting in the two cylinder pressure chambers 8, 10, i.e. it applies the higher pressure to the inlet orifices 248 so that a separate pressure supply unit and thus a separate pump for the bearing positions can be dispensed with.

Naturally, it is also possible in conjunction with this embodiment of hydrostatic radial pocket bearing to modify the number of bearing pockets without thereby changing anything in the basic construction and function of the bearing. The connecting conduits $252_1$ to $252_4$ are preferably formed by through holes which are particularly simple to produce. Departing from the illustrated embodiment, it is also possible to form the depressions in the piston to constitute the bearing pockets, the outlet grooves and the inlet orifice in a separate bearing sleeve which is secured with a pressure fit on the piston body. The bearing pockets can obviously also be constructed as previously described in relation to FIGS. 5 and 6.

Figure 9:
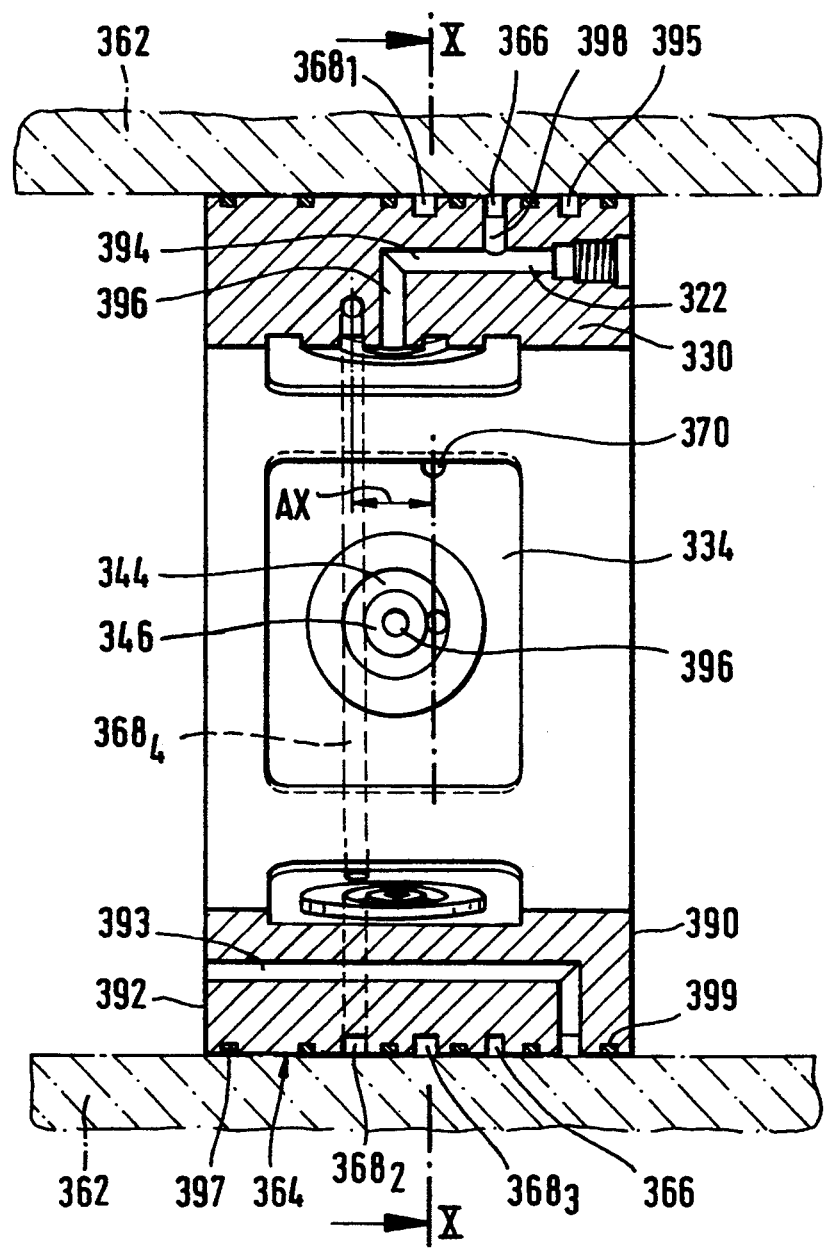
FIG. 9 is an axial section of a further embodiment of a bearing bush.
Figure 10:
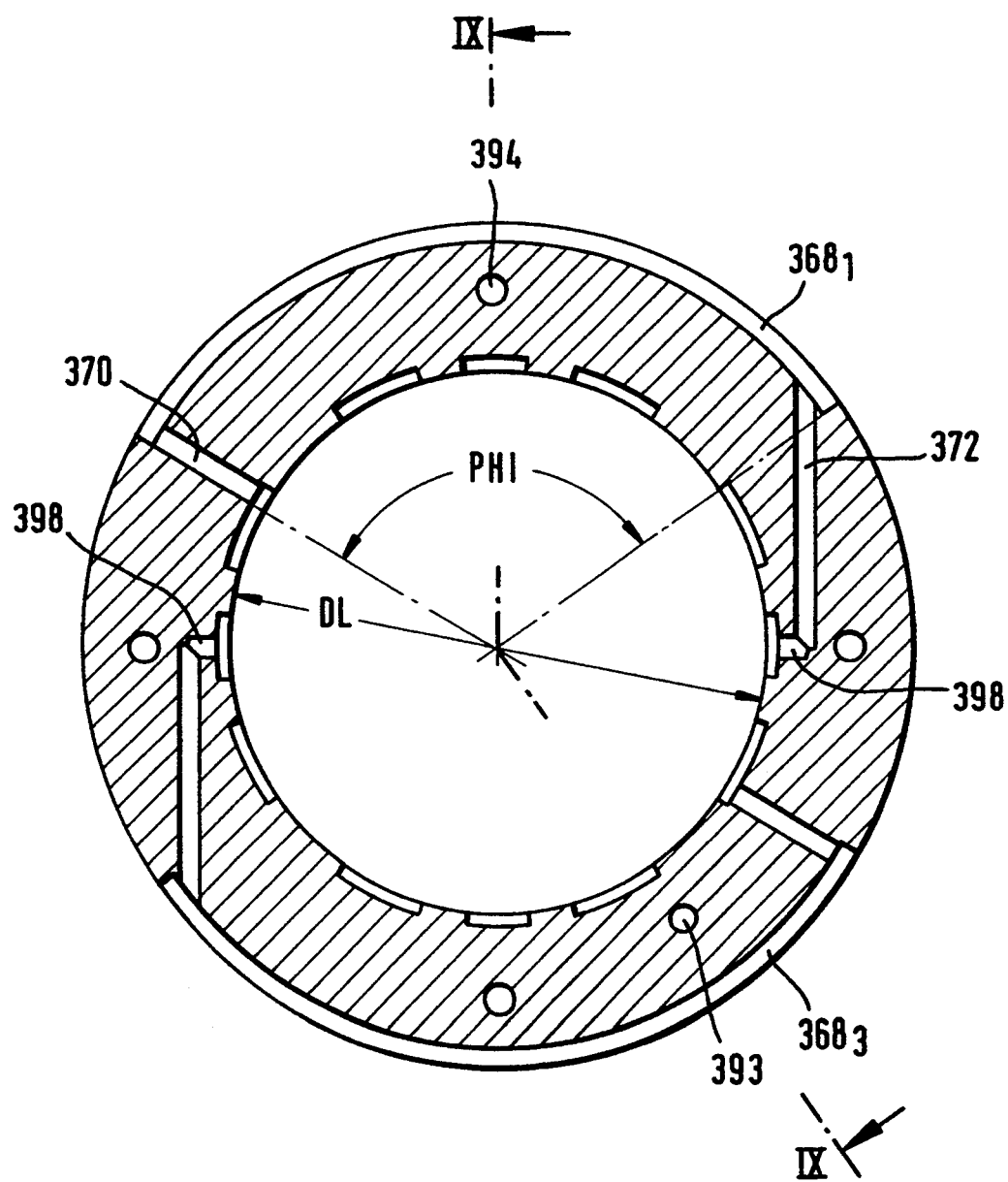
FIG. 10 is a section on the line X—X in FIG. 9.

Finally, FIGS. 9 and 10 illustrate an embodiment of hydrostatic radial pocket bearing of simple construction and at the same time high operating reliability. For the sake of simplicity, those parts of this embodiment of bearing corresponding in function to the previously described components are provided with reference numerals increased by 300.

Figure 4:
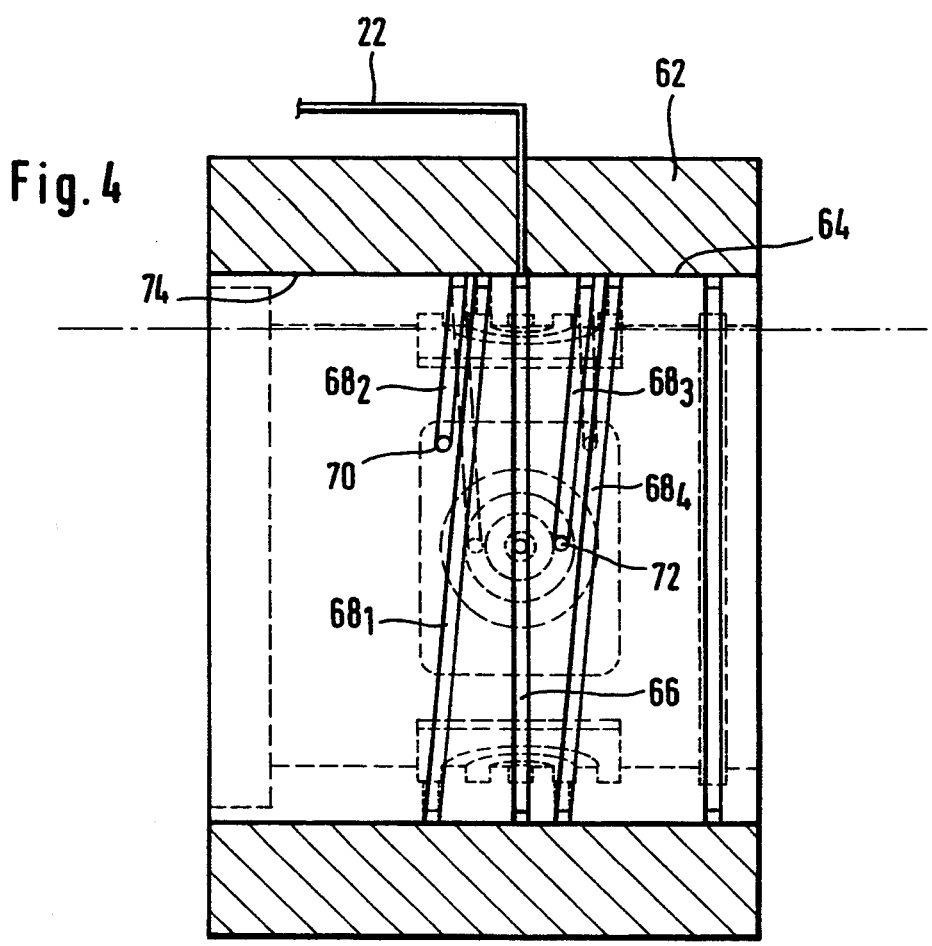
FIG. 4 is a side elevation of a bearing bush of a further embodiment of the hydrostatic bearing.

In this embodiment, the bearing pockets 334 are, as in FIG. 4, machined into a bearing bush 330 which, in turn, is fitted in a thicker sleeve 362 indicated in chain dotted lines. The sleeve 362 thus forms a kind of shrink connection for the bearing bush 330.

In this construction, the supply of hydraulic flow medium is again by way of grooves which are formed on the outside of a cylinder surface 364, extend circumferentially and are sealed from each other. The pressure supply conduit at pump pressure is shown at 322 and it is fed axially from one end 390. Each bearing pocket 334 is associated with an axially extending blind hole 394 which merges with a branch passage 396 leading to the bearing. One of the blind holes has a screwthread for the pressure medium connection whereas the other blind hole is closed by a plug. The blind holes intercommunicate by way of an annular circumferential groove 366 in the outer surface 364 from which blind holes 398 extend to the associated blind holes 394.

346 indicates annular webs disposed between a pump pressure supply orifice 396 and an annular outlet groove 344 in which the aforementioned intermediate pressure obtains that is fed by way of a connecting conduit into the bearing pocket of the diametrally opposite bearing position. The connecting conduits between the outlet grooves and the opposed bearing pockets are for the most part formed as simple depressions or grooves $368_1$ to $368_4$ in the outer cylinder surface 364, so that the supply of the bearing pocket oil also takes place from the outside.

Whereas the annular groove 366 machined into the outer surface 364 is annular to distribute the pump pressure and is thus closed in itself, the groove sections $368_1$ to $368_4$ extend only over a central angle PHI which is kept as small as possible and is less than 180°. Each of these groove sections terminates at branch passages 370 or 372 by way of which the connection can be made to the respective outlet groove 344 or to the bearing pocket 334 on the diametrally opposite side.

Every two groove sections, in the illustrated example the groove sections $386_1$ and $368_3$ associated with the opposed bearing positions or the groove sections $368_2$ and $368_4$, are disposed in one radial plane so that, in the case of a bearing with four bearing pockets, two axially adjacent rows of grooves are provided. The axial spacing of the rows of grooves is evident from FIG. 9 and is there designated AX. It is preferably selected to be large and can be a maximum be as large as the diameter of the outlet grooves 344 if the branch passages lie in a respective single radial plane.

The central angle PHI can be minimised by leading at least one branch passage, in the illustrated example the branch passage 372, not radially to the axis of the bush but substantially tangentially to the internal bearing diameter DL, a short branch hole 398 producing the connection between the branch passage 372 and the outlet groove 344. As a result of this construction, one obtains a circumferential spacing (central angle 180° PHI) which is as large as possible between the two adjacent groove sections at the periphery, so that, in the assembled condition of the sleeve 362, there is not mutual influencing of the intermediate pressures, even if small amounts of leakage oil are to come out of the groove sections.

Seals 397 are received in annular grooves 399 of the bush 362 and are disposed between the axially adjacent grooves or rows of grooves. In this way, mutual influencing of the pressures subsisting in the individual grooves or groove sections is excluded, for which purpose especially the seal between the annular groove 366 and the axially adjacent row of grooves $368_1$ and $368_2$ is of importance. Since the groove 366 at pump pressure is disposed at the outside and more particularly in the outer region of the bearing pocket rather than between the groove sections $368_1$ to $368_4$ which are at the intermediate pressure, only one such seal is required for sealing the pump pressure against the intermediate pressure.

FIG. 9 shows that laterally adjacent to the pump pressure grooves 366 and on the side remote from the intermediate pressure grooves there can be a still further leakage outlet groove 395 which may be screened by a seal 397 and which leads to a passage 393.

The hereinbefore described principle of passage construction is, of course, also applicable if, in departure from the illustrated embodiment with four circumferentially uniformly distributed bearing pockets, a larger even number of bearing pockets is provided.

Accordingly, The invention provides a hydrostatic radial pocket bearing for a servo cylinder, especially for a high performance testing cylinder, as employed, for example, in test rig or simulation technology. The radial pocket bearing is suitable for the highly precise regulation of the piston and to receive large transverse forces acting on the piston rod. An even number of bearing pockets uniformly distributed over the bearing periphery is fed from a pressure fluid source by way of associated preliminary throttles connected to pressure supply conduits and by way of an associated connecting conduit. The preliminary throttles are formed by the bearing gap between a supply orifice and at least one outlet groove in an opposite bearing pocket, the being in the form of a re-entrant depression either in the fixed or in the moving bearing portion. To reduce the loss energy caused by leakage and at the same time raise the force bearing capacity, the pressure drop of the pressure fluid flowing to both sides axially away from the bearing pocket is different.

I claim:

1. A hydrostatic radial pocket bearing for an axially moveable servo cylinder for receiving transverse forces acting on a piston rod thereof which projects from a working cylinder thereof, comprising an even number of bearing pockets which are uniformly distributed over the bearing periphery and which are fed from a source of pressure fluid by way of associated preliminary throttles connected to pressure supply conduits which are at pump pressure and by way of an associated connecting conduit which is at an intermediate pressure, characterized in that the preliminary throttles (46; 146; $146^2$; 246) are formed by a bearing gap between a supply orifice (48; 148; 248; 396) and at least one outlet groove (44; 144; 244; 344) which is in the form of a depression defined in surrounding relation to said supply orifice, and a pressure drop of the pressure fluid flow axially away from the bearing pocket (34; 134; 234; 334) is different on both sides, an axial length of a guiding surface of said piston rod within said cylinder on each side of said bearing pocket assembly being adapted to a pressure prevailing on said respective side of said piston.

2. A pocket bearing according to claim 1, characterised in that it is formed in the region of at least one piston rod guide (16) of the servo cylinder (4) and that a discharge conduit (58) is provided at an axial spacing (A) from the bearing pocket boundary (40) on the side remote from the cylinder chamber (8).

3. A pocket bearing according to claim 2, characterised in that the bearing pockets (34, 36), the supply orifices (48; 148) and the outlet grooves (44; 144) are formed in the fixed bearing portion.

4. A pocket bearing according to claim 3, characterised by a bearing bush (30; 130; 330) which is a friction fit in a rigid sleeve (62; 362) of the piston rod guide (16).

5. A pocket bearing according to claim 4, characterised in that the supply of the hydraulic flow medium to the bearing position takes place by way of grooves (68, 66; $368_1$ to $368_4$, 366) which are sealed from each other and extend in the outer surface (64; 364) of the bearing bush (30; 330).

6. A pocket bearing according to claim 5, characterised in that the groove (366) at pump pressure (P) is circumferential and the grooves at intermediate pressure (Z) are formed by the circumferentially distributed groove sections ($368_1$ to $368_4$).

7. A pocket bearing according to claim 6, characterized in that the groove (366) at pump pressure is disposed laterally at an axial spacing adjacent to the axially adjacent grooves (368) which are at the intermediate pressure.

8. A pocket bearing according to claim 6, characterized in that the connection of the groove (366) at pump pressure and/or the leakage outlet groove (395) takes place by way of axial passages (394, 393) from one end (390, 392) of the bearing bush (330).

9. A pocket bearing according to claim 6, characterized in that the connecting conduits ($252_1$ to $252_4$) are formed by axially staggered transverse holes.

10. A pocket bearing according to claim 6, characterized in that the spacing between two circumferentially adjacent groove sections ($368_1$ and $368_3$ or $368_2$ and $368_4$) is as large as possible.

11. A pocket bearing according to claim 10, characterized in that at least one branch passage (372) from a groove section (368) to the bearing zone has a section which is substantially tangential to the bearing diameter (DL).

12. A pocket bearing according to claim 6, characterised in that every two groove sections ($368_1$ and $368_3$) are disposed in a common radial plane.

13. A pocket bearing according to claim 12, characterized in that the groove (366) at pump pressure is disposed laterally at an axial spacing adjacent to the axially adjacent grooves (368) which are at the intermediate pressure.

14. A pocket bearing according to claim 12, characterized in that the connection of the groove (366) at pump pressure and/or the leakage outlet groove (395) takes place by way of axial passages (394, 393) from one end (390, 392) of the bearing bush (330).

15. A pocket bearing according to claim 5, characterised in that the pressure supply conduits (66; 366) and/or the connecting conduits ($68_1$ to $68_4$; $368_1$ to $368_4$) are machined into the outside (64; 364) of the bearing bush (30; 330) and are closed by the sleeve (62; 362).

16. A pocket bearing according to claim 15, characterised in that the connecting conduits ($252_1$ to $252_4$) are formed by axially staggered transverse holes.

17. A pocket bearing according to claim 15, characterized in that the groove (366) at pump pressure (P) is circumferential and the grooves at intermediate pressure (Z) are formed by the circumferentially distributed groove sections ($368_1$ to $368_4$).

18. A pocket bearing according to claim 15, characterized in that the groove (366) at pump pressure is disposed laterally at an axial spacing adjacent to the axially adjacent grooves (368) which are at the intermediate pressure.

19. A pocket bearing according to claim 15, characterised in that the spacing between two circumferentially adjacent groove sections ($368_1$ and $368_3$ or $368_2$ and $368_4$) is as large as possible.

20. A pocket bearing according to claim 19, characterised in that at least one branch passage (372) from a groove section (368) to the bearing zone has a section which is substantially tangential to the bearing diameter (DL).

21. A pocket bearing according to claim 20, characterized in that the groove (366) at pump pressure is disposed radially outwardly of the bearing pocket (334).

22. A pocket bearing according to claim 15, characterized in that the connection of the groove (366) at pump pressure and/or the leakage outlet groove (395) takes place by way of axial passages (394, 393) from one end (390, 392) of the bearing bush (330).

23. A pocket bearing according to claim 20, characterized in that the groove (366) at pump pressure is disposed laterally at an axial spacing adjacent to the axially adjacent grooves (368) which are at the intermediate pressure.

24. A pocket bearing according to claim 5, characterised in that the groove (366) at pump pressure is disposed laterally at an axial spacing adjacent to the axially adjacent grooves (368) which are at the intermediate pressure.

25. A pocket bearing according to claim 24, characterised in that, on the side of the groove (366) at pump pressure that is remote from the groove (368) at intermediate pressure, a preferably circumferential leakage outlet groove (395) is provided at an axial spacing.

26. A pocket bearing according to claim 25, characterized in that the connection of the groove (366) at pump pressure and/or the leakage outlet groove (395) takes place by way of axial passages (394, 393) from one end (390, 392) of the bearing bush (330).

27. A pocket bearing according to claim 24, characterised in that a respective sealing ring (397) disposed in a circumferential groove (399) is provided between the axially adjacent grooves (366) or groove sections (368).

28. A pocket bearing according to claim 27, characterized in that, on the side of the groove (366) at pump pressure that is remote from the groove (368) at intermediate pressure, a preferably circumferential leakage outlet groove (395) is provided at an axial spacing.

29. A pocket bearing according to claim 5, characterised in that the groove (366) at pump pressure is disposed radially outwardly of the bearing pocket (334).

30. A pocket bearing according to claim 29, characterized in that, on the side of the groove (366) at pump pressure that is remote from the groove (368) at intermediate pressure, a preferably circumferential leakage outlet groove (395) is provided at an axial spacing.

31. A pocket bearing according to claim 5, characterised in that the connection of the groove (366) at pump pressure and/or the leakage outlet groove (395) takes place by way of axial passages (394, 393) from one end (390, 392) of the bearing bush (330).

32. A pocket bearing according to claim 5, characterised in that the bearing bush (30; 330) is surrounded by a shrink connection (362).

33. A pocket bearing according to claim 2 or claim 3, characterised in that the discharge groove (58) is formed in the fixed bearing portion.

34. A pocket bearing according to claim 33, characterized by a bearing bush (30; 130; 330) which is a friction fit in a rigid sleeve (62; 362) of the piston rod guide (16).

35. A pocket bearing according to claim 34, characterized in that the supply of the hydraulic flow medium to the bearing position takes place by way of grooves (68,66; $368_1$ to $368_4$, 366) which are sealed from each other and extended in the outer surface (64; 364) of the bearing bush (30; 330).

36. A pocket bearing according to claim 35, characterized in that the pressure supply conduits (66; 366) and/or the connecting conduits ($68_1$ to $68_4$; $368_1$ to $368_4$) are machined into the outside (64; 364) of the bearing bush (30; 330) and are closed by the sleeve (62; 362).

37. A pocket bearing according to one of claims 2 to 3, characterised in that the axial spacing (A) is smaller than the axial width (BA) of the bearing gap (54) adjoining the cylinder chamber (8).

38. A pocket bearing according to claim 37, characterised in that the axial width (BA) is about two to three times the axial spacing (A).

39. A pocket bearing according to claim 1, characterised in that it is provided in the region of the piston (6) and that the bearing pockets (234), the supply orifices (248) and the outlet grooves (244) are formed in the piston surface.

40. A pocket bearing according to claim 39, characterised in that the pressure supply conduits ($22_1$ to $22_4$) extend from a central pressure medium conduit (22) in the piston (6).

41. A pocket bearing according to claim 1, characterised in that the supply orifices are formed by a circular depression (48; 248) arranged concentric to an outlet groove (44; 244) surrounding same.

42. A pocket bearing according to claim 1, characterised in that the supply orifices are formed by axial grooves (148) each extending between one pair of axially aligned outlet grooves (144).

43. A pocket bearing according to claim 1, characterised in that the bearing pockets (34; 134; 234) are formed by flat grooves extending substantially in a rectangle.

44. A pocket bearing according to claim 1, characterised in that the pressure supply conduits (282, 284, 222) of the bearing pockets (234) extend through a change-over valve (286) which is connected to the two cylinder pressure chambers (8, 10).

* * * * *